6986X
F. Gray,
Pegging Jack,
Patented Apr. 6, 1832.
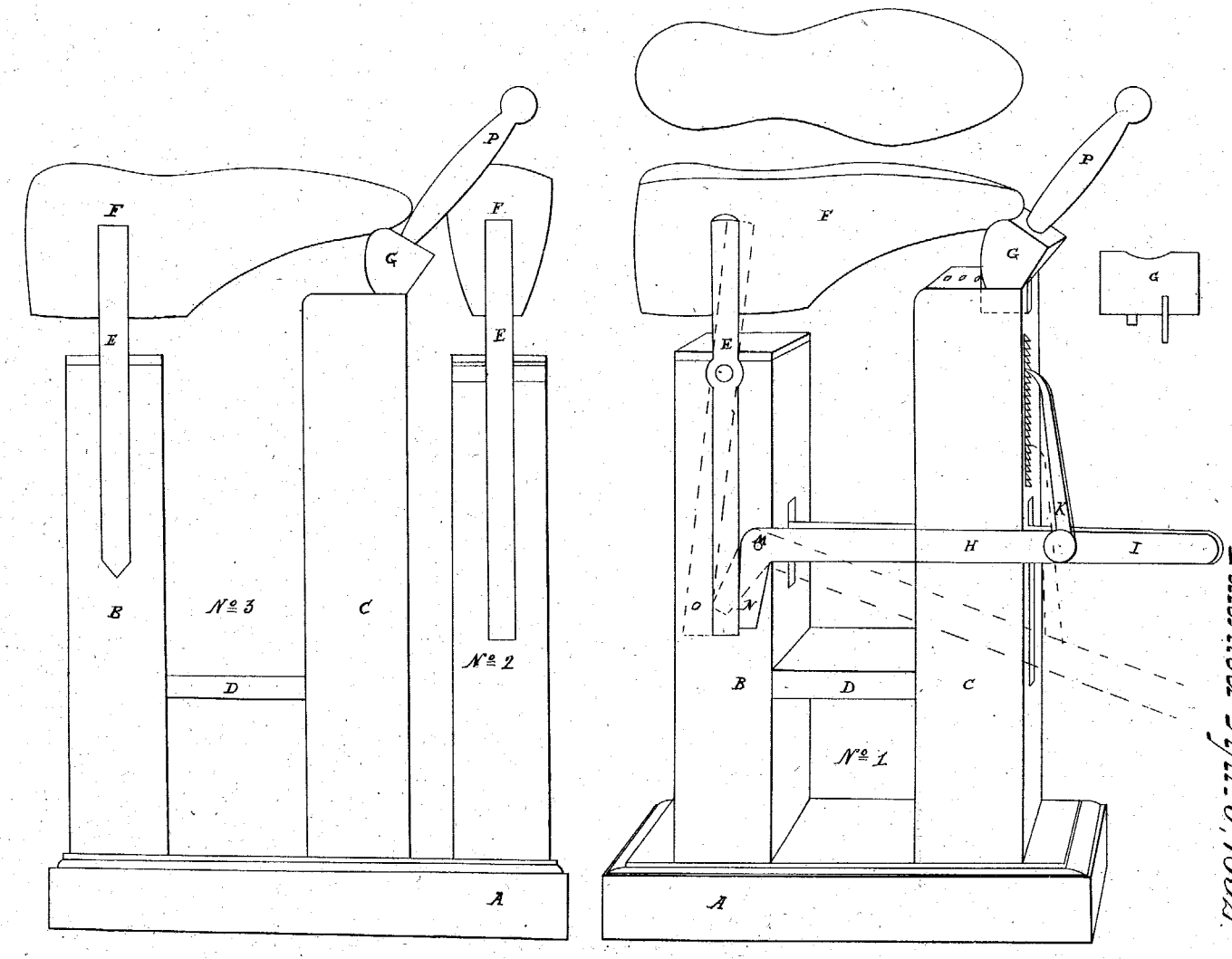
N. PETERS, PHOTO-LITHOGRAPHER WASHINGTON, D. C.

69860x   Apl 6.1832

Frederick Gray.
Letters Patent.

The Schedule referred to in these Letters Patent and making part of the same containing a description in the words of the said Frederick Gray himself of his Improvement in the machine used for Pegging Shoes and Boots To all to whom these Presents shall come
Be it known that I Frederick Gray of Rowley in the County of Essex and Commonwealth of Massachusetts have invented a new and useful Improvement in a machine used for the purpose of Pegging Shoes and Boots and that the following is a full & exact description of the construction and operation of said Improvement as invented or improved by me a model whereof has been forwarded to the Patent Office viz Specification and Description of an improvement in a machine for the purpose of pegging shoes & boots, to secure to the inventor the benefits of that improvement. It being by means of a hole in the last between the instep and heel, for the purpose of holding the last on the heel or upright lever. also for the stud, or upright lever, for the purpose of holding the last, when placed on the stud or upright lever (having the power of holding the last with the stud or upright lever by reason) of the stud or upright lever binding in the hole of the last, or by binding by the side of the post. securing it in that position and removing the difficulties experienced in securing the same: which occurs in every other machine known to be now in use. A,B, C. and D. are descriptions of an old machine in common use. A the bed piece of the machine. B. a post in the head of which is the lever or stud E. which is made to fit a hole in the last F. the toe of which will rest in a hollow in the block G. lying on the head of the post C. G. The block which supports the toe of the last. on the under side of which will be a new feather made to fit a groove in the head of the post, likewise a pin which corresponds with a row of holes in the head of the post, to keep the block from moving out of its place. the holes to be drilled so as to accommodate the different lengths of the lasts See in Port folio H. is the right angled lever: supported by the pin or prop M. in the centre of the post B. the handle J. coming through the post C. K. the latch attached to the handle J. by a joint the point catching in the ratchet L. P. the pin or handle of the moveable block G. The Improvements claimed are as follows to wit: First for making a hole in the last, between the heel and the instep to fit a stud or lever in the head of the post B. deep enough to hold the last steady and firm Second for making a Stud B. in the drawing No 3. to be driven in or firmly secured to the head of the post B. the top part of the stud or pin to fit snug into the hole of the last and may be used as follows viz. The last being put into the shoe or Boot and the last turned bottom upwards and placed on the stud the toe resting on the block G. then by driving on the heel of the shoe or Boot until the stud or pin binds in the hole in the last, and will firmly secure it in a position for pegging. or the toe may rest on the head of the post C. when by driving on the heel, the last will be held firmly as before. The last may be loosened by striking under the heel of the last or by placing the pin P. in the hole in the block G. and pressing it downwards, the block G will be turned outward and will loosen, and free the last. Third by suspending the stud or lever B. at or near the top of the post B. as in the drawing No 1 and 2 and the model, then placing the last on the stud or lever as before with the toe resting as before, then by pressing the hand down on the handle J. of lever H. the point N. will press the part of the lever B. towards O. as marked by the dotted lines in the drawing No 1, the top of the lever B. will bind in the hole of the last and press the toe firmly on the block G. when by pressing the catch K. into the ratchet L. the last will be firmly secured in its place and made ready for pegging. The last may be loosened as before. A right angled or bent lever has been adopted in this model to tighten the last, although a cam or wedge, pulley and weights, or spring may be sometimes used, or a crank. Fourth By placing the pin or stud firmly in the last instead of the post, as in No 3. drawing and by making a hole in the top of the post B. to fit the pin or stud, then by driving on the heel as in No 2 the last will be tightened as before the stud or lever binding in the last, or in, or against the post, the same results would 69986x Apl 6, 1832 be obtained
Witnesses
Saml. Hice
Wm. Wood

Frederick Gray

~~Geo. Reddy~~

1.00